United States Patent
Odaka et al.

[11] Patent Number: 5,165,974
[45] Date of Patent: Nov. 24, 1992

[54] MULTILAYER PLASTICS CONTAINERS AND METHODS OF PRODUCING THE SAME

[75] Inventors: Hiroshi Odaka; Hiroshi Maeda; Hiroyuki Takahashi; Toyokazu Yamada, all of Himeji, Japan

[73] Assignee: Idemitsu Petrochemical Co., Ltd., Chiyoda, Japan

[21] Appl. No.: 603,212

[22] Filed: Oct. 25, 1990

[30] Foreign Application Priority Data

Oct. 30, 1989 [JP] Japan ................... 1-279889

[51] Int. Cl.$^5$ ............... B32B 7/06; B65D 77/20
[52] U.S. Cl. .................... 428/35.7; 428/35.9; 428/192; 428/121; 220/356; 220/359
[58] Field of Search ............ 428/35.7, 35.9, 192, 428/516, 517, 121, 156, 213, 332; 220/354, 355, 356, 453, 359; 206/631, 484

[56] References Cited

U.S. PATENT DOCUMENTS 4,905,838 3/1990 Suzuki et al. ............. 206/631

FOREIGN PATENT DOCUMENTS

| 0282773 | 9/1988 | European Pat. Off. . |
| 0305976 | 3/1989 | European Pat. Off. . |
| 0306982 | 3/1989 | European Pat. Off. . |
| 2235042 | 1/1974 | Fed. Rep. of Germany . |
| 58-1672 | 1/1983 | Japan . |
| 58-33459 | 2/1983 | Japan . |
| 61-154846 | 7/1986 | Japan . |

*Primary Examiner*—Ellis P. Robinson
*Assistant Examiner*—Charles R. Nold
*Attorney, Agent, or Firm*—Antonelli, Terry, Stout & Kraus

[57] ABSTRACT

A multilayer container with a flange for sealing with a lid, wherein the thickness of the inner surface layer at the inner edge of the flange is thinner than that in the sealing area, is produced by a method wherein a circular portion of a multilayer sheet to be the flange is held at a certain pressure while the multilayer sheet is being thermoformed under specified molding conditions, with the other portion than the circular portion being stretched. Even a seal ring having an even surface serves as a means for sealing the resulting multilayer container with a lid while ensuring easy openability.

12 Claims, 4 Drawing Sheets

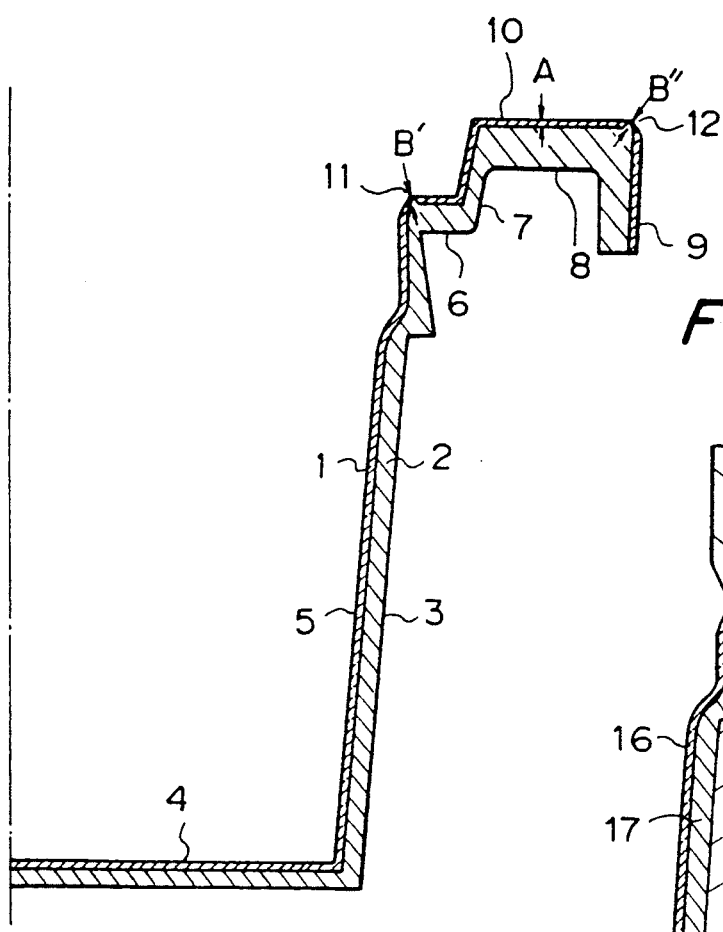
Fig. I(a)
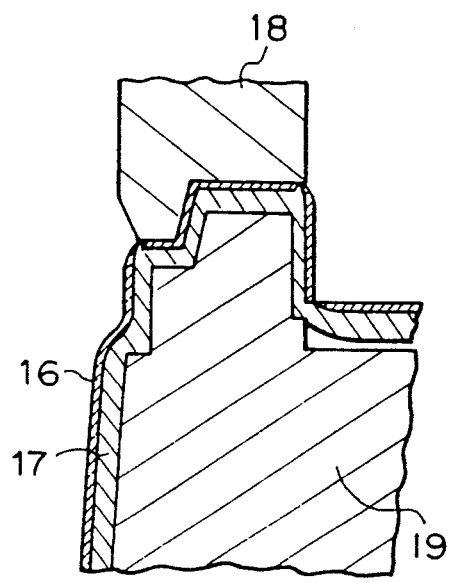
Fig. I(b)

MULTILAYER PLASTICS CONTAINERS AND METHODS OF PRODUCING THE SAME

BACKGROUND OF THE INVENTION (a) Field of the Invention

The present invention relates to a multilayer plastic container and a method of producing the same which accommodates foods or drinks and is sealed with a lid to preserve the contents. More particularly, the present invention relates to a multilayer plastic container and a method of producing the same which uses the delamination between the inner surface layer and the layer contacting the inner surface layer thereof for removing a lid to open it, nevertheless it can be sealed with the lid merely by using a sealing ring having an even surface, with easy openability rendered thereto.

(b) Description of the Related Art

There is known a method for opening a packaging container in which, as shown in FIG. 5, a flanged multilayer container sealed with a lid at the flange portion thereof is opened by using the delamination therein between its inner surface layer and the layer contacting the inner surface layer and completing the opening by breaking the inner surface layer near the open end of the multilayer container. Because the opening of such a packaging container proceeds between the layers of the multilayer container, the packaging container has an advantage that the lid and the inner surface layer of the multilayer container may be sealed strongly to each other while ensuring easy openability. This opening method, however, involves the break of the inner surface layer of the multilayer container near the open end of the multilayer container, thereby requiring the formation of a circular recess in the inner surface layer in order to facilitate the breaking. The formation of the circular recess has been performed by sealing the multilayer container with a lid, using a specified sealing ring having a circular projection.

SUMMARY OF THE INVENTION

An object of the present invention is to provide a multilayer container which does not require a seal ring of a specified form and can be sealed by using a conventional seal ring having an even surface while ensuring the easy opening utilizing the delamination in the multilayer container.

Another object of the present invention is to provide a method suitable for the production of the multilayer container.

As a result of researches for attaining the object described above, the inventors have found that a multilayer container which has an inner surface layer having a specified tensile breaking strength and a specified thickness can be obtained by a method wherein a circular portion of a multilayer sheet to be a flange portion is held at a certain pressure while the multilayer sheet is being thermoformed under specified forming conditions, with the other portion than the circular portion being stretched, and that even a seal ring having an even surface serves as a means for sealing the resulting multilayer container with a lid while ensuring easy openability. On the basis of the knowledge, the inventors completed the present invention.

That is, the present invention provides a multilayer plastics container having (a) a multilayer structure including (1) an inner surface layer and (2) a layer contacting the inner surface layer, wherein the peeling strength between the inner surface layer and the layer contacting the inner surface layer is at most 2.0 kg/15 mm at a peeling speed of 300 mm/min, (b) a container body including a bottom wall and a side wall upstanding from the bottom wall; and (c) a flange surrounding the open end of said container body and extending outwardly therefrom, said flange having in its upper surface a sealing area extending circularly therein, the sealing area being for sealing said multilayer plastics container with a lid by securing the lid circularly to said multilayer plastic container at the sealing area;

the inner surface layer being made of a material having a tensile breaking strength of C kg/cm$^2$, having a thickness of A μm at the sealing area in said flange, and having a thickness of B μm at the edge between said flange and the side wall, the numerical values of A, B, and C being so related to each other through the following inequalities or equations $$A \geq 1.1 \times B$$

$$B \leq (1.33/C) \times 10,$$

and the tensile load per unit width required to break the inner surface layer at the edge between said flange and the side wall being smaller than the load per unit width required to peel the inner surface layer from the layer contacting the inner surface layer at the edge between said flange and the side wall.

The present invention further provides a multilayer plastic container having (a) a multilayer structure comprising (1) an inner surface layer and (2) a layer contacting the inner surface layer, wherein the peeling strength between the inner surface layer and the layer contacting the inner surface layer is at most 2.0 kg/15 mm at a peeling speed of 300 mm/min, (b) a container body including a bottom wall and a side wall upstanding from the bottom wall; and (c) a flange which surrounds the open end of said container body, said flange including (1) a lower flange portion surrounding the open end of said container body and extending outwardly from the open end of said container body, (2) a joining portion upstanding from the outer end of the lower flange portion, and (3) an upper flange portion surrounding the open end of the joining portion, extending outwardly from the open end of the joining portion, and having on its upper surface a sealing area extending circularly therein, the sealing area being for sealing said multilayer plastic container with a lid by securing the lid circularly to said multilayer plastic container at the sealing area;

the inner surface layer being made of a material having a tensile breaking strength of C kg/cm$^2$, having a thickness of A μm at the sealing area in the upper flange portion, and having a thickness of B' μm at the edge between the lower flange portion and the side wall, the numerical values of A, B', and C being so related to each other through the following inequalities or equations $$A \geqq 1.1 \times B'$$

$$B' \leqq (1.33/C) \times 10^4,$$

and the tensile load per unit width required to break the inner surface layer at the edge between the lower flange portion and the side wall being smaller than the load per unit width required to peel the inner surface layer from the layer contacting the inner surface layer at the edge between the lower flange portion and the side wall.

The multilayer plastic containers may be produced efficiently by a method according to the present invention wherein a multilayer plastic sheet is thermoformed under specified molding conditions while the inner surface layer and the layer contacting the inner surface layer are maintained at specifically increased temperatures, respectively, and the multilayer sheet is stretched with a circular portion thereof corresponding to a flange portion held at a certain pressure.

BRIEF DESCRIPTION OF THE DRAWINGS

Each of FIG. 1(a), FIG. 2(a), FIG. 3(a)

Each of FIG. 1(b), FIG. 2(b)

DESCRIPTION OF THE PREFERRED EMBODIMENTS

Figure 2A:
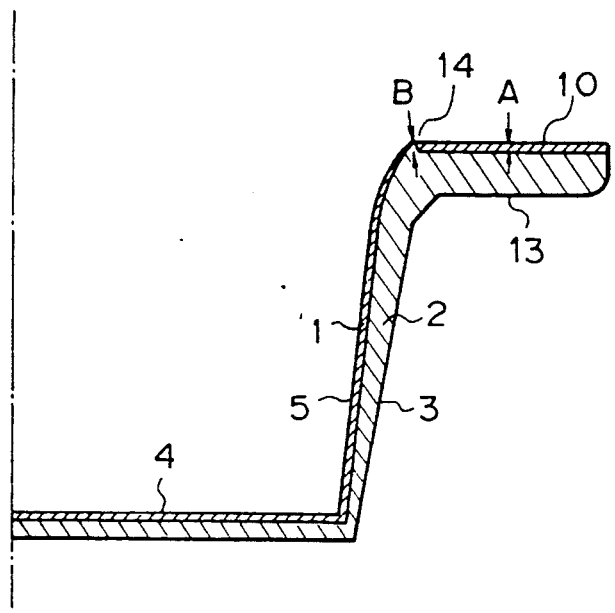

Herein, the tensile breaking strength is measured according to JIS K 7113.

In the multilayer plastic container of the present invention, the peeling strength between the inner surface layer and the layer contacting the inner surface layer is at most 2.0 kg/15 mm at a peeling speed of 300 mm/min., preferably at most 1.5 kg/15 mm at a peeling speed of 300 mm/min.

The flange of the multilayer plastics container of the present invention may have a straight rim or a curled rim which extends downwardly from the outer end of the flange. In such an embodiment where a straight rim or a curled rim is provided, the opening of the multilayer plastic container can be easily performed without any trouble by adjusting the thickness of B" μm of the inner surface layer at the edge between said flange and the straight rim or the curled rim so that the numerical values of A, B", and C are so related to each other through the following inequalities or equations $$A \geqq 1.1 \times B''$$

$$B'' \leqq (1.33/C) \times 10^4,$$

and adjusting the strength of the inner surface layer at the edge between said flange and the straight rim or the curled rim so that the inner surface layer at the edge is capable of being broken with a smaller tensile load than the load required to peel the inner surface layer from the layer contacting the inner surface layer at the edge between said flange and the straight rim or the curled rim.

Hereinafter, the present invention will be described referring to the drawings.

FIG. 1(a) is a partially sectional view of a multilayer plastic container of an embodiment according to the present invention, which has a multilayer structure consisting of an inner surface layer 1 and a layer 2 contacting the inner surface layer, and having the lower flange portion and the upper flange portion in its flange (6, 7, 8, 9). In FIG. 1(a), a referential numeral 3 represents a container body comprising a bottom wall 4 and a side wall 5 upstanding from the bottom wall 4. A referential numeral 6 represents a lower flange portion, a referential numeral 7 represents a joint portion upstanding from the outer end of the lower flange portion 6, the referential numeral 8 represents an upper flange portion extending outwardly from the open end of the joint portion 7, and a referential numeral 9 represents a straight rim extending downwardly from the outer edge of the upper flange portion 8. The upper flange portion 8 and the straight rim 9 construct together a skirt flange. A referential numeral 10 represents a sealing area extending circularly in the upper surface of the upper flange portion 8, and the inner surface layer 1 has a thickness of A μm at the sealing area 10. The inner surface layer 1 is made thinner to B' μm at the edge 11 between the side wall 5 and the lower flange portion 6, and is also made thinner to B" μm at the edge 12 between the upper flange portion 8 and the straight rim 9. When a lid sealed at the upper flange portion 8 is removed to open the multilayer plastic container, the inner surface layer 1 between the edges 11 and 12 is peeled from the layer 2, broken at the edges 11 and 12, and removed together with the lid.

FIG. 2(a) is a partially sectional view of a multilayer plastic container of an embodiment according to the present invention, which has a flat flange 13 having neither the lower flange portion nor the straight or curled rim. In this embodiment, the outer edge of the flange 13 need not be made thinner, and the inner surface layer 1 is broken only at the edge 14 between the side wall 5 and the flange 13 where the inner surface layer is made thinner to B μm.

Figure 3A:
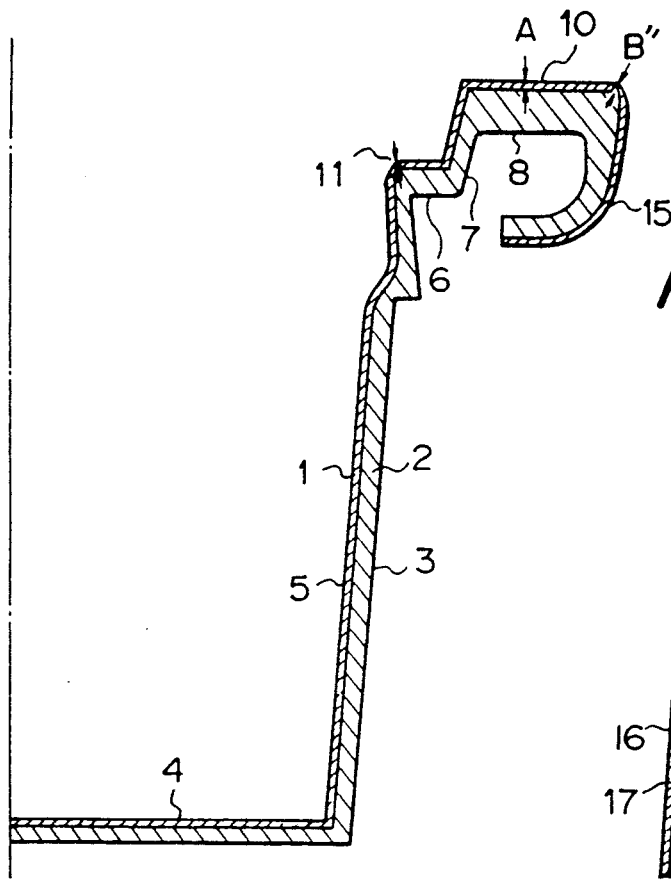
FIG. 3(b) is a partially sectional view illustrating a multilayer plastic sheet being thermoformed into a multilayer plastic container, with a circular portion thereof corresponding to a flange held.

FIG. 3(a) is a partially sectional view of a multilayer plastic container of an embodiment according to the present invention, which has a flange (6, 7, 8, 15) including the lower flange portion 6, the joint portion 7, the upper flange portion 8, and a curled rim 15.

Figure 4:
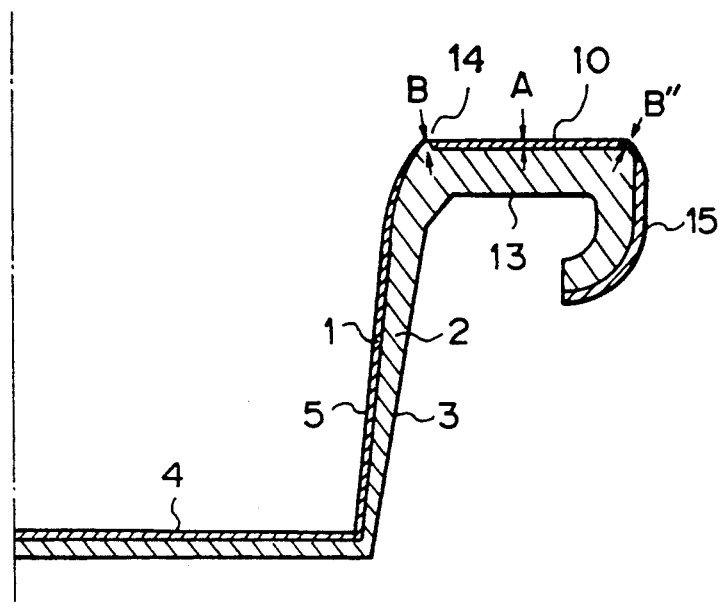
FIG. 4 is a partially sectional view of a multilayer plastic container of an embodiment according to the present invention.
Figure 5:
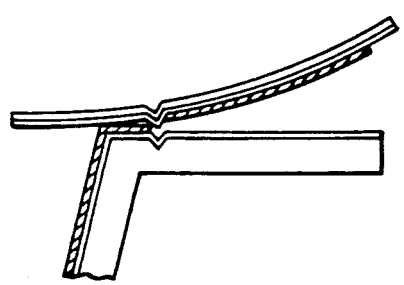
FIG. 5 is a partially sectional view illustrating a conventional easily openable packaging container being opened.

FIG. 4 is a partially sectional view of a multilayer container of an embodiment according to the present invention, which has a flat flange 13 and a curled rim 15 extending downwardly from the outer end of the flange 13. The inner surface layer 1 is made thinner to B μm at the edge between the side wall 5 and the flange 13, and is made thinner to B" μm at the edge between the flange 13 and the curled rim 15.

In these multilayer containers according to the present invention, the numerical values of the thicknesses (μm) of the inner surface layer, A, B, B', and B" and the numerical values of the tensile breaking strength (kg/cm$^2$) of the material of the inner surface layer, C, need be so related through the inequalities or equations described above. If the numerical value of A is too small, the sealing strength produced by the inner surface layer and a lid will be too small to use the resulting packaging container as a hermetic container. The preferred thickness of the inner surface layer at the sealing area is from 30 to 300 μm, more preferably from 50 to 250 μm. If the numerical values of B, B', and B" are too large, the inner surface layer will be incapable of being broken, and opening will be impossible. For instance, when the inner surface layer is a polypropylene having a tensile breaking strength of 250 kg/cm$^2$, B, B', and B" need to be at most 53 $\mu$m, and A needs to be at least 1.1×B (and B' and B").

The multilayer plastic container having such a specified thickness as described above may be produced, for example, by the following method according to the present invention.

That is, the method of the present invention is a method of producing a multilayer plastic container which has (a) a multilayer structure including
  (1) an inner surface layer and
  (2) a layer contacting the inner surface layer
(b) a container body including
  (1) a bottom wall and
  (2) a side wall upstanding from the bottom wall,
wherein said container body having a developed area ratio of at least 1.2; and
(c) a flange surrounding the open end of said container body and extending outwardly from the open end of said container body.

and the method comprises
(A) heating a multilayer plastic sheet, said multilayer plastic sheet comprising
  (1) a surface layer made of a plastic material and being to be the inner surface layer of said multilayer plastic container after the production thereof and
  (2) a layer made of a plastic material and contacting the surface layer,
wherein the peeling strength between the surface layer and the layer contacting the surface layer is at most 2.0 kg/15 mm at a peeling speed of 300 mm/min, to increase the temperature of the surface layer at least to a temperature 50° C. lower than the melting point or softening point of the plastic material of the surface layer to adjust the viscosity of the surface layer to from $1 \times 10^4$ to $5 \times 10^7$ poises, and to increase the temperature of the layer contacting the surface layer at least to 125° C., and (B) thermoforming said multilayer plastic sheet in a die, the temperature of which is at most 120° C., at a stretching speed of at least 1 m/s, preferably at least 3 m/s, while the temperatures of the surface layer and the layer contacting the surface layer are maintained at the increased temperatures, respectively, and a circular portion of said multilayer plastic sheet which is to be said flange of said multilayer plastic container, except for a circular portion which is to be in the close vicinity of the open end of said container body, is held at a pressure of at least 1 kg/cm$^2$.

Preferably, the thermoforming is conducted so that the resulting multilayer plastic container has a developed area ratio of at least 1.5, more preferably at least 3.

Herein, the stretching speed means the speed at which a plug used for thermoforming is inserted in a die.

In case of the multilayer plastic container of the present invention which has the flange including the lower flange portion, the joining portion, and the upper flange portion, the multilayer plastic container may be produced in the same procedure described above with the exception that during the thermoforming, a circular portion of the multilayer plastic sheet which is to be said flange of said multilayer plastic container, except for a circular portion which is to be in the close vicinity of the open end of said container body, is held at a pressure of at least 1 kg/cm$^2$.

Figure 2B:
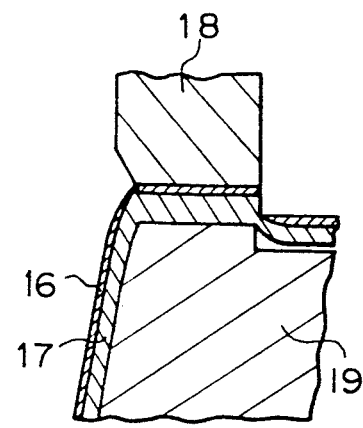
Figure 3B:
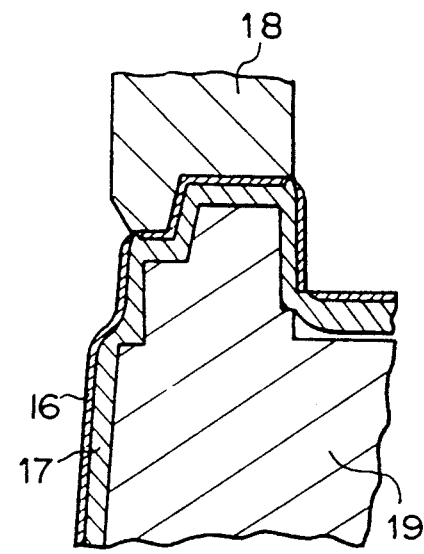

In the above-described conditions for thermoforming, as shown in FIGS. 1(b), 2(b), and 3(b), the holding of the multilayer plastic sheet is performed by using a clamp 18 and a die 19. If the multilayer sheet is held at a clamping pressure lower than 1 kg/cm$^2$, or the temperatures of the surface layer 16 of the multilayer plastics sheet and the layer 17 contacting the surface layer are out of the ranges described above, or the stretching speed is less than 1 m/s, or the temperature of the die is higher than 120° C., or the developed area ratio of the multilayer plastic sheet is less than 1.2, the proper adjustment of the thickness of the inner surface layer will be difficult. It is preferable to adjust the viscosity of the surface layer to from $1 \times 10^4$ to $5 \times 10^7$ poises.

The thermoforming may be performed generally by pressure forming, vacuum forming or plug-assist forming, where the die 19 is used.

Some examples of the multilayer plastic sheet to be used for the production of the multilayer plastic container wherein the peeling strength between the surface layer, which is to be the inner surface layer of the multilayer plastic container, and the layer contacting the surface layer is at most 2.0 kg/15 mm at a peeling speed of 300 mm/min include those having the following multilayer structures.

(1) PE (polyethylene)/PP (polypropylene)/AD (adhesive) /EVOH (ethylene-vinylalcohol copolymer) [PVDC (polyvinylidenechloride)]/AD/PP
(2) PE/PP
(3) PP/PE/PP/AD/EVOH (PVDC)/AD/PP
(4) PP/PE/PP
(5) PP/PP+filler/AD/EVOH (PVDC)/AD/PP+filler /PP
(6) PP/PP+filler/PP
(7) PE+PP/PE+PP+filler/AD/EVOH (PVDC) AD/PP+PE+filler/PE+PP
(8) PE+PP/PE+PP+filler/PE+PP
(9) PE/PE+PP+filler/AD/EVOH (PVDC)/AD/PE+PP +filler/PE
(10) TPX (polymethylpentene-1)/PE (PP)/AD/PE (PP)
(11) PC (polycarbonate)/PE (PP)/AD/EVOH (PVDC)/AD/ PE (PP)
(12) PET (polyethyleneterephthalate)/PE (PP)/AD/EVOH (PVDC)/AD/PE (PP)

In every multilayer structure described above, the first one is the surface layer which is to be the inner surface layer of the multilayer plastics container, and the second one is the layer contacting the surface layer.

The present invention will be described in more detail with reference to the following Examples. These Examples, however, are not to be construed to limit the scope of the invention.

EXAMPLES 1 TO 8 AND COMPARATIVE EXAMPLES 1 TO 6

Example 1

A multilayer plastic sheet consisting of a surface layer (thickness: 120 $\mu$m) which is made of a high density polyethylene (PE) having a melting point of 133° C., a melt index (MI) of 0.12, and a density of 0.96 g/cm$^3$ and a layer (thickness: 1,680 $\mu$m) which contacts the surface layer and is made of a homopolypropylene (PP) having a melting point of 165° C., MI of 0.5, and a density of 0.91 g/cm³ was heated to adjust the temperature of the surface layer to 165° C. and the temperature of the layer contacting the surface layer to 160° C. After the heating, the viscosity of the surface layer was $1.83 \times 10^6$ poises, and the viscosity of the layer contacting the surface layer was $2.77 \times 10^6$ poises. The multilayer plastic sheet was then held between a portion of a die corresponding to a flange and a clamp at a surface pressure of 6 kg/cm², and the temperature of the die was adjusted to 35° C. Subsequently, plug-assist forming was carried out with a stretching speed maintained at 17 m/s, to obtain a multilayer plastic container having a developed area ratio of 1.5.

The materials of the multilayer plastic sheet, the thicknesses of the surface layer and the layer contacting the surface layer, the conditions of thermoforming, the thickness of the inner surface layer of the resulting multilayer plastics container at the peeling portion, and the openability of the multilayer plastic container are shown in Table 1.

The peeling strength of the PP layer and the PE layer was 0.8 kg/15 mm at a peeling speed of 300 mm/min, and the tensile breaking strengths of the PP and the PE were 440 kg/cm² and 310 kg/cm², respectively.

EXAMPLES 2 TO 8 AND COMPARATIVE EXAMPLES 1 TO 6

The same procedure as in Example 1 was repeated with the exception that the multilayer plastic sheets as shown in Table 1 were used and the conditions of thermoforming were changed as shown in Table 1, to obtain the multilayer plastic containers having the thickness of the inner surface layers at their peeling portions as shown in Table 1. Openability of each of the resulting multilayer plastic containers is shown in Table 1.

The openability was evaluated by sealing the multilayer plastic containers with lids followed by peeling the lids. The one exhibiting easy openability was valued ◯, and the one exhibiting no easy openability was valued ✕.

The measurement of viscosity was carried out by using a Visco-Elastic Spectrometer type F-III produced by Iwamoto Seisakusho Co., Ltd.

The multilayer plastic containers produced in the Examples exhibited easy openability as well as hermetic sealing property though they were produced without forming a notch or using a pressing seal ring having a specified shape.

The conventional thermoforming couldn't adjust the thickness of the inner surface layer at the sealing area and the thickness of the inner surface layer at the edge for breaking to predetermined ranges. In particular, in Comparative Example 6, punching following to the thermoforming went badly, thereby deteriorating forming-reproducibility.

TABLE 1

| | Multilayer plastic sheet | | | | Conditions of thermoforming | | | |
|---|---|---|---|---|---|---|---|---|
| | Surface layer | | Layer contacting the surface layer | | Surface layer | | Layer contacting the surface layer | |
| | Resin | Thickness (μm) | Resin | Thickness (μm) | Temp. (°C.) | Viscosity (poise) | Temp. (°C.) | Viscosity (poise) |
| Example | | | | | | | | |
| 1 | PE | 120 | PP | 1680 | 165 | $1.83 \times 10^6$ | 160 | $2.77 \times 10^6$ |
| 2 | PE | 80 | PP | 1720 | 153 | $2.00 \times 10^6$ | 149 | $8.86 \times 10^6$ |
| 3 | PE | 120 | PP | 1680 | 167 | $1.64 \times 10^6$ | 161 | $2.75 \times 10^6$ |
| 4 | PE | 80 | PP | 1720 | 135 | $1.25 \times 10^7$ | 130 | $2.33 \times 10^7$ |
| 5 | PP | 120 | PE | 1680 | 167 | $1.64 \times 10^6$ | 161 | $2.15 \times 10^6$ |
| 6 | PP | 80 | PE | 1720 | 151 | $7.51 \times 10^6$ | 130 | $1.62 \times 10^7$ |
| 7 | PP | 120 | PE | 1680 | 157 | $2.17 \times 10^6$ | 151 | $3.32 \times 10^6$ |
| 8 | PP | 80 | PE | 1720 | 164 | $1.96 \times 10^6$ | 160 | $2.54 \times 10^6$ |
| Comparative Example | | | | | | | | |
| 1 | PE | 120 | PP | 1680 | 162 | $1.97 \times 10^6$ | 155 | $5.13 \times 10^6$ |
| 2 | PE | 120 | PP | 1680 | 83 | $8.03 \times 10^7$ | 79 | $6.04 \times 10^7$ |
| 3 | PE | 120 | PP | 1680 | 156 | $2.39 \times 10^6$ | 149 | $6.86 \times 10^6$ |
| 4 | PE | 120 | PP | 1680 | 163 | $1.77 \times 10^6$ | 157 | $4.17 \times 10^6$ |
| 5 | PP | 120 | PE | 1680 | 150 | $4.51 \times 10^6$ | 145 | $4.48 \times 10^6$ |
| 6 | PE | 80 | PP | 1720 | 147 | $3.89 \times 10^6$ | 141 | $1.61 \times 10^7$ |

| | Conditions of thermoforming | | | | | Multilayer plastic containes | | | |
|---|---|---|---|---|---|---|---|---|---|
| | Clamping pressure (kg/cm²) | Stretching speed (m/s) | Temp. of die (°C.) | Developed area ratio | Shape of flange | Thickness of inner surface layer (μm) | | | Openability |
| | | | | | | A | B or B' | B" | |
| Example | | | | | | | | | |
| 1 | 6 | 8.5 | 35 | 1.5 | *¹flat | 79 | 7 | — | ◯ |
| 2 | 1 | 5 | 28 | 4 | *¹flat | 63 | 15 | — | ◯ |
| 3 | 6 | 8.5 | 43 | 4 | *²curled rim | 61 | 13 | 11 | ◯ |
| 4 | 3 | 3 | 70 | 4 | *²curled rim | 81 | 12 | 15 | ◯ |
| 5 | 5 | 7 | 35 | 4 | *¹flat | 71 | 9 | — | ◯ |
| 6 | 9 | 10 | 19 | 4 | *¹flat | 69 | 10 | — | ◯ |
| 7 | 3 | 8.5 | 27 | 4 | *²curled rim | 78 | 12 | 9 | ◯ |
| 8 | 6 | 3 | 60 | 4 | *²curled rim | 69 | 9 | 8 | ◯ |
| Comparative Example | | | | | | | | | |
| 1 | 0 | 8.5 | 35 | 4 | *¹flat | 82 | 79 | — | ✕ |
| 2 | 3 | 5 | 35 | 4 | *²curled rim | 95 | 91 | 25 | ✕ |
| 3 | 2 | 0.5 | 35 | 4 | *²curled rim | 69 | 61 | 25 | ✕ |

TABLE 1-continued

| 4 | 3 | 7.5 | 140 | 4 | *2 curled rim | 49 | 47 | 19 | X |
| 5 | 0 | 8.5 | 51 | 4 | *2 curled rim | 77 | 68 | 71 | X |
| 6 | 0 | 9.5 | 37 | 4 | *1 flat | 73 | 69 | — | X |

*1 flange having the shape as shown in FIG. 2(a)
*2 flange having the shape as shown in FIG. 3(a)

What is claimed is:

1. A multilayer plastic container having
 (a) a multilayer structure including
  (1) an inner surface layer and
  (2) a layer contacting the inner surface layer, wherein the peeling strength between the inner surface layer and the layer contacting the inner surface layer is at most 2.0 kg/15 mm at a peeling speed of 300 mm/min,
 (b) a container body including a bottom wall and a side wall upstanding from the bottom wall formed from said multilayer structure; and
 (c) a flange surrounding the open end of said container body and extending outwardly from the side wall of the container body, said flange having in its upper surface a sealing area extending annularly therein, the sealing area being for sealing said container body with a lid by securing the lid annularly to said container body at the sealing area;
the inner surface layer being made of a material having a tensile breaking strength of C kg/cm$^2$, having a thickness of A μm at the sealing area in said flange, and having a thickness of B μm at an edge between said flange and the side wall, the numerical values of A, B and C being so related to each other through the following inequalities or equations $$A \geq 1.1 \times B$$

$$B \leq (1.33/C) \times 10^4,$$

and the tensile load per unit width required to break the inner surface layer at the edge between said flange and the side wall being smaller than the load per unit width required to peel the inner surface layer from the layer contacting the inner surface layer at the edge between said flange and the side wall.

2. The multilayer plastic container of claim 1, wherein the inner surface layer is a high density polyethylene and the layer contacting the inner surface layer is a polypropylene.

3. The multilayer plastic container of claim 1, wherein the inner surface layer is a polypropylene and the layer contacting the inner surface layer is a high density polyethylene.

4. The multilayer plastic container of claim 1, wherein said flange further has a straight rim or a curled rim extending downwardly from the outer end of said flange and the inner surface layer has a thickness of B″ μm at the edge between said flange and the straight rim or the curled rim, the numerical values of A, B″, and C being so related to each other through the following inequalities or equations $$A \geq 1.1 \times B''$$

$$B'' \leq (1.33/C) \times 10^4,$$

and the tensile load per unit width required to break the inner surface layer at the edge between said flange and the straight rim or the curled rim is smaller than the load per unit width required to peel the inner surface layer from the layer contacting the inner surface layer at the edge between said flange and the straight rim or the curled rim.

5. The multilayer plastic container of claim 4, wherein the inner surface layer is a high density polyethylene and the layer contacting the inner surface layer is a polypropylene.

6. The multilayer plastic container of claim 4, wherein the inner surface layer is a polypropylene and the layer contacting the inner surface layer is a high density polyethylene.

7. A multilayer plastic container having
 (a) a multilayer structure comprising
  (1) an inner surface layer and
  (2) a layer contacting the inner surface layer, wherein the peeling strength between the inner surface layer and the layer contacting the inner surface layer is at most 2.0 kg/15 mm at a peeling speed of 300 mm/min,
 (b) a container body including a bottom wall and a side wall upstanding from the bottom wall formed from the multilayer structure; and
 (c) a flange which surrounds the open end of said container body, said flange including
  (1) a lower flange portion surrounding the open end of said container body and extending outwardly from the side wall of the container body to provide an edge surrounding the open end of said container body,
  (2) a joining portion upstanding from the outer end of the lower flange portion, and
  (3) an upper flange portion surrounding an open end of the joining portion, extending outwardly from the open end of the joining portion and having on its upper surface a sealing area extending annularly therein, the sealing area being for sealing said container body with a lid by securing the lid annularly to said container body at the sealing area;
the inner surface layer being made of a material having a tensile breaking strength of C kg/cm$^2$, having a thickness of A μm at the sealing area in the upper flange portion, and having a thickness of B′ μm at the edge between the lower flange portion and the side wall, the numerical values of A, B′ and C being so related to each other through the following inequalities or equations $$A \geq 1.1 \times B'$$

$$B' \leq (1.33/C) \times 10^4,$$

and the tensile load per unit width required to break the inner surface layer at the edge between the lower flange portion and the side wall being smaller than the load per unit width required to peel the inner surface layer from the layer contacting the inner surface layer at the edge between the lower flange portion and the side wall.

8. The multilayer plastic container of claim 7, wherein the inner surface layer is a high density polyethylene and the layer contacting the inner surface layer is a polypropylene layer.

9. The multilayer plastic container of claim 7, wherein the inner surface layer is a polypropylene and the layer contacting the inner surface layer is a high density polyethylene.

10. The multilayer plastic container of claim 7, wherein said flange further has a straight rim or a curled rim extending downwardly from the outer end of the upper flange portion and the inner surface layer has a thickness of B″ μm at the edge between the upper flange portion and the straight rim or the curled rim, the numerical values of A, B″, and C being so related to each other through the following inequalities or equations $$A \geqq 1.1 \times B''$$

$$B'' \leqq (1.33/C) \times 10^4,$$

and the tensile load per unit width required to break the inner surface layer at the edge between the upper flange portion and the straight rim or the curled rim is smaller than the load per unit width required to peel the inner surface layer from the layer contacting the inner surface layer at the edge between the secondary flange portion and the straight rim or the curled rim.

11. The multilayer plastic container of claim 10, wherein the inner surface layer is a high density polyethylene and the layer contacting the inner surface layer is a polypropylene.

12. The multilayer plastic container of claim 10, wherein the inner surface layer is a polypropylene and the layer contacting the inner surface layer is a high density polyethylene.

* * * * *